(12) United States Patent
Krishna et al.

(10) Patent No.: US 6,553,477 B1
(45) Date of Patent: Apr. 22, 2003

(54) MICROPROCESSOR AND ADDRESS TRANSLATION METHOD FOR MICROPROCESSOR

(75) Inventors: Murali V. Krishna, Campbell, CA (US); Vipul Parikh, Campbell, CA (US); Michael Butler, Campbell, CA (US); Gene Shen, Campbell, CA (US); Masahito Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 86 days.

(21) Appl. No.: 09/707,347

(22) Filed: Nov. 6, 2000

(51) Int. Cl.$^7$ ................................................ G06F 12/00
(52) U.S. Cl. ...................... 711/207; 711/122; 711/126; 711/128; 711/205; 711/206; 711/207; 700/200
(58) Field of Search ................................. 711/206, 207, 711/203, 122, 128, 205; 700/200

(56) References Cited

U.S. PATENT DOCUMENTS

| | | | |
|---|---|---|---|
| 3,839,706 A | * 10/1974 | Borchsenius | 711/200 |
| 5,860,147 A | * 1/1999 | Gochman et al. | 711/207 |
| 6,073,224 A | * 6/2000 | Watkins | 711/202 |
| 6,223,263 B1 | * 4/2001 | Mathews et al. | 711/163 |

FOREIGN PATENT DOCUMENTS

| | | |
|---|---|---|
| JP | 3-218546 A | 9/1991 |
| JP | 11-203203 A | 7/1999 |

* cited by examiner

*Primary Examiner*—Do Hyun Yoo
*Assistant Examiner*—Ngoc Dinh
(74) *Attorney, Agent, or Firm*—Fenwick & West LLP

(57) ABSTRACT

A microprocessor is equipped with an address translation mechanism for performing dynamic address translation from a virtual address to a physical address on a page-by-page basis. The microprocessor includes a large-capacity low-associativity address translation buffer, and is capable of avoiding limitations imposed on a TLB entry lock function, while reducing the overhead for address translation. The address translation mechanism comprises an address translation buffer having an entry lock function, and control logic for controlling the operation of the address translation buffer. The address translation buffer includes a lower-level buffer organized as a lower-level hierarchy of the address translation buffer and having no entry lock function, and a higher-level buffer organized as a higher-level hierarchy of the address translation buffer and having an entry lock function, the higher-level buffer having higher associativity than the associativity of the lower-level buffer.

31 Claims, 4 Drawing Sheets

MICROPROCESSOR AND ADDRESS TRANSLATION METHOD FOR MICROPROCESSOR

BACKGROUND OF THE INVENTION

1. Field of the Invention

The present invention relates to a microprocessor and an address translation method for the microprocessor.

2. Description of the Related Art

In a computer employing a virtual memory system, translation from a virtual address to a physical address must be dynamically performed, on a page-by-page basis, during program execution. The hardware mechanism for implementing this address translation is called the dynamic address translator (DAT). The DAT performs the address translation by referring to a table called the address translation table or page table. The address translation table, which is provided within main memory and is managed by an operating system (OS), is a table that indicates, for example, which virtual page number corresponds to which physical page number.

However, if reference is made to the address translation table each time an address translation is performed, the overhead for address translation will increase; therefore, considering the locality of address reference, it is generally practiced to cache the previously used address translations (mapping between virtual page number and physical page number) in high-speed memory. This memory is called the address translation buffer or translation look-aside buffer (TLB).

Previously, the TLB has been implemented mostly by a small-capacity associative memory. However, since the virtual address space is enlarging (for example, to a 64-bit space) to accommodate increasing program size, it is becoming common for microprocessors to integrate a large capacity TLB with high hit rate in order to. increase performance.

On the other hand, in the case of a large-capacity TLB, if associativity (the number of ways) is increased, not only the physical size of the memory but the access time also increases. Accordingly, associativity has to be kept low, and this limits the number of address translations that can be cached simultaneously for a main memory page having the same index address.

This limitation leads to a limitation on the TLB entry lock function, a performance enhancing technique generally applied to program and data regions having a high frequency of use and, in some cases, having to be resident in main storage for correct operations. That is, the TLB entry function is necessary to ensure that address translations for the code and data regions of an OS will remain cached in the TLB, but in the case of a low associativity TLB, the number of TLB entries capable of holding address translations to be locked is small (limited by the number of ways), and as it turned out, this can lead to the problem that proper system operation cannot be guaranteed.

In previous microprocessors, this problem was solved by increasing the associativity of the TLB, which was possible since the number of TLB entries was relatively small. However, with increasing performance of microprocessors, there has arisen the need to provide a larger number of TLB entries. In view of this, in recent microprocessors, not only to provide a large number of TLB entries but also to solve the above problem, it is beginning to be practiced to provide in addition to a large-capacity TLB a relatively small TLB for entry lock purposes. However, if more than one TLB is provided, when the OS performs replacement of TLB entries, it becomes necessary to select a TLB for entry storage by examining entry lock bits, and this leads to increased overhead.

In cases where hardware automatically performs replacement of TLB entries by searching through the address translation table in the main memory, one possible method is to divide the TLBs between one for holding locked entries and one for holding nonlocked entries, and to have the hardware automatically select the TLB for entry storage, and this in fact serves to reduce the overhead. However, when indexing into the TLBs for address translation, the plurality of TLBs have to be indexed into simultaneously and, when multiple memory accesses are to be performed simultaneously, the large-capacity TLB has to be provided with increased number of ports, resulting in the problem that the size further increases and the access time becomes longer.

SUMMARY OF THE INVENTION

The present invention has been devised in view of the above-outlined problems, and an object of the invention is to provide a microprocessor equipped with a large-capacity TLB and capable of avoiding the limitations imposed on the TLB entry lock function while reducing the overhead for address translation, and also to provide an address translation method for the microprocessor.

According to the present invention, there is provided a microprocessor for performing dynamic address translation from a virtual address to a physical.address on a page-by-page basis, the microprocessor comprising: (a) an address translation buffer having an entry lock function and including (1) a 2nd-level buffer organized as a lower hierarchy of the address translation buffer and having no entry lock function, and (2) a 1st-level buffer organized as a higher hierarchy of the address translation buffer and having the entry lock function, the 1st-level buffer having higher associativity than the associativity of the 2nd-level buffer; and (b) control logic for controlling operation of the address translation buffer.

Preferably, the 2nd-level buffer is larger in capacity than the 1st-level buffer.

Preferably, address translation for each page is stored in an address translation table residing in a main memory managed by an operating system, the address translation table has a data structure that contains a specifier indicating whether or not a corresponding address translation is to be locked in the address translation buffer, and the control logic locks an entry in the 1st-level buffer in accordance with the lock specifier contained in the data structure of the address translation table.

Preferably, the control logic selects an entry to be replaced in the address translation buffer in accordance with a prescribed replacement algorithm and notifies the operating system, and the operating system performs the replacement of the entry in the address translation buffer.

Preferably, when an entry replacement by the operating system occurs, if the address translation table a in the main memory shows that the address translation to be newly registered is specified to be locked, then the newly registered address translation is stored in the 1st-level buffer and held locked therein.

Preferably, when an entry replacement by the operating system occurs, if the address translation table in the main memory shows that the address translation to be newly registered is specified to be locked, then the newly registered address translation is stored in the 2nd-level buffer and, at the same time, is stored in the 1st-level buffer and held locked therein.

Preferably, when the control logic has selected in accordance with the replacement algorithm an entry in the 2nd-level buffer as the entry to be replaced, the control logic reports the selection of the entry in the 2nd-level buffer to the operating system, and the operating system accomplishes the replacement by only replacing the entry in the 2nd-level buffer, thereby maintaining intact the address translation locked in the 1st-level buffer.

Preferably, for entries other than the entry specified to be locked, a relationship always holds such that any entry stored in the 1st-level buffer is also stored in the 2nd-level buffer.

Preferably, the control logic selects an entry to be replaced in the address translation buffer in accordance with a prescribed replacement algorithm, retrieves the address translation to be newly registered from the address translation table residing in the main memory, and performs the replacement of the entry in the address translation buffer.

Preferably, when performing the replacement of the entry in the address translation buffer, the control logic refers to the address translation table in the main memory to see whether or not the address translation to be newly registered is specified to be locked and, if so specified, stores the newly registered address translation in the 1st-level buffer and locks the registered address translation therein.

Preferably, when performing the replacement of the entry in the address translation buffer, the control logic refers to the address translation table in the main memory to see whether or not the address translation to be newly registered is specified to be locked and, if so specified, stores the newly registered address translation in the 1st-level buffer and locks the registered address translation therein, while also storing the registered address translation in the 2nd-level buffer.

Preferably, when the control logic has selected, in accordance with the replacement algorithm, an entry in the 2nd-level buffer as the entry to be replaced, the control logic only replaces the entry in the 2nd-level buffer, thereby maintaining intact the address translation locked in the 1st-level buffer.

Preferably, for entries other than the entry specified to be locked, a relationship always holds such that any entry stored in the 1st-level buffer is also stored in the 2nd-level buffer.

According to the present invention, there is also provided a method for implementing dynamic address translation from a virtual address to a physical address, in a microprocessor, comprising the steps of: preparing an address translation buffer consisting of a 2nd-level buffer having no entry lock function and a 1st-level buffer having an entry lock function and having higher associativity than the associativity of the 2nd-level buffer; preparing in a main memory an address translation table for storing address translation for each page, the address translation table having a data structure containing a specifier to indicate whether or not a corresponding address translation is to be locked in the address translation buffer; and locking an entry in the 2nd-level buffer in accordance with the lock specifier contained in the data structure of the address translation table.

Preferably, the method further comprises the step of selecting an entry to be replaced in the address translation buffer in accordance with a prescribed replacement algorithm, and performing the replacement of the entry in the address translation buffer.

Preferably, the method further comprises the step of performing the entry replacement by storing newly registered address translation in the 1st-level buffer and locking the registered address translation therein if the address translation table in the main memory shows that the address translation to be newly registered is specified to be locked.

Preferably, the method further comprises the step of performing the entry replacement by storing newly registered address translation in the 1st-level buffer and locking the registered address translation therein, while also storing the registered address translation in the 2nd-level buffer, if the address translation table in the main memory shows that the address translation to be newly registered is specified to be locked.

According to the present invention, there is also provided a computer incorporating the above-described microprocessor.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 1:
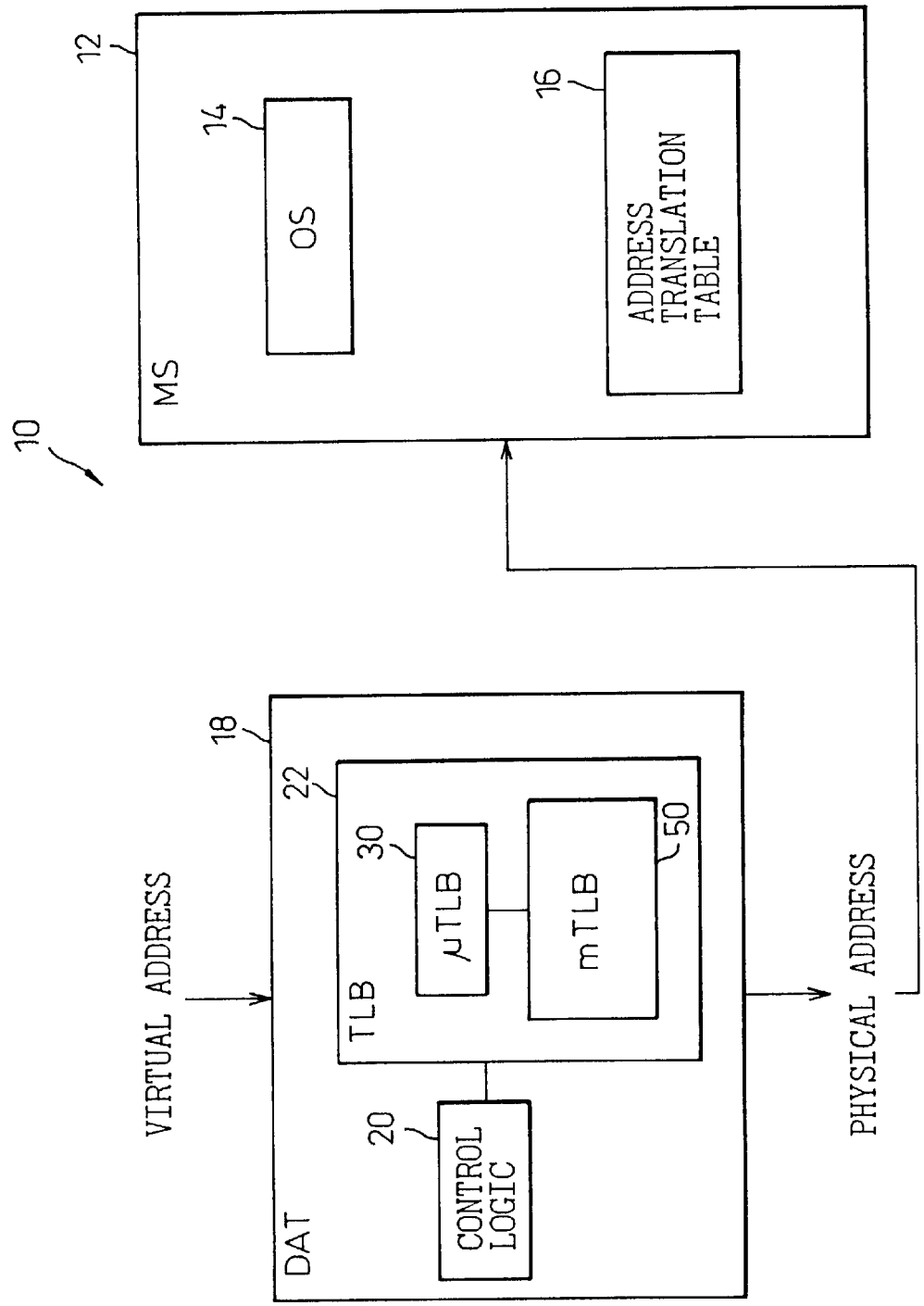
FIG. 1 is a block diagram showing a portion responsible for address translation within a microprocessor according to the present invention.

FIG. 1 is a-block diagram showing a portion responsible for address translation within a microprocessor 10 according to the present invention. The microprocessor 10 employs a virtual memory system, and any address in a main memory is specified by an instruction via a virtual address. The virtual address is translated into a physical,address on a page-by-page basis. Information indicating which virtual page number corresponds to which physical page number is stored in an address translation table 16 residing in the main memory 12. The address translation table 16 is managed by an operating system (OS) 14.

A dynamic address translator (DAT) 18 is a hardware mechanism which translates the virtual address to a physical address during program.execution, and includes control logic 20. If reference were made to the address translation table 16 each time an address translation is performed, the overhead for address translation would increase; therefore, the DAT 18 is equipped with a high-speed memory 22, called the address translation buffer or translation look-aside buffer (TLB), so that the previously used address translations (mapping between virtual page number and physical page number) can be cached.

In the present invention, the TLB 22 is organized in a hierarchical manner, and contains a micro TLB ($\mu$TLB) 30 as a 1st-level buffer and a main TLB (mTLB) 50 as a 2nd-level buffer. The μTLB 30 has a small capacity and high associativity by giving special regard to speed and hit rate, while the mTLB 50 has a large capacity and relatively low associativity by giving special regard to overall performance.

Figure 2:
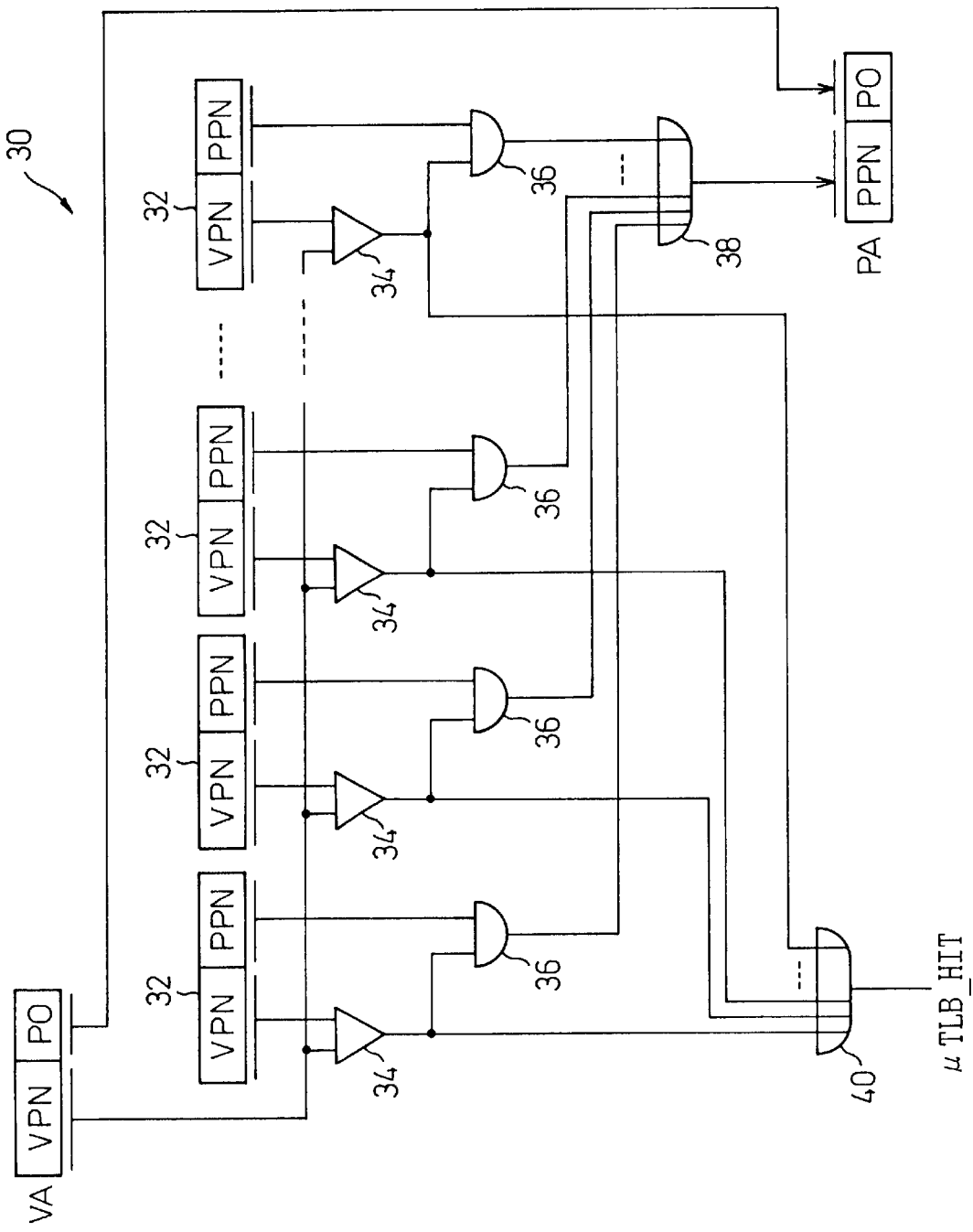
FIG. 2 is a block diagram showing the organization of an 1st-level TLB.

FIG. 2 is a block diagram showing the organization of the μTLB 30. The μTLB 30 is organized, for example, as a 64-way full associative memory having a comparator for each entry. Generally, a full associative memory has the advantages that the hit rate is high, and that there are no limitations as to in which entry an address translation is to be stored, but the disadvantages are that the size increases, and that the speed decreases if the number of entries is increased.

The virtual page number (VPN) stored in each entry within the μTLB 30 is compared in the comparator 34 with the virtual page number (VPN) carried in the virtual address (VA) to be translated. If there is an entry having the matching virtual page number (VPN), the physical page number (PPN) in that entry is selected through an AND gate 36 and an OR gate 38, and used to form the physical address (PA). The page-offset (PO) carried in the virtual address (VA) to be translated is passed unchanged and used as the page-offset (PO) in the physical address (PA).

When there is an entry having a virtual page number that matches the virtual page number carried in the virtual address to be translated, a μTLB_HIT signal, an output of an OR gate 40, is set active to complete the, address translation. On the other hand; when there is no entry having a virtual page number that matches the virtual page number carried in the virtual address to be translated, the μTLB_HIT signal is set inactive, in response to which reference is now made to the mTLB 50.

Figure 3:
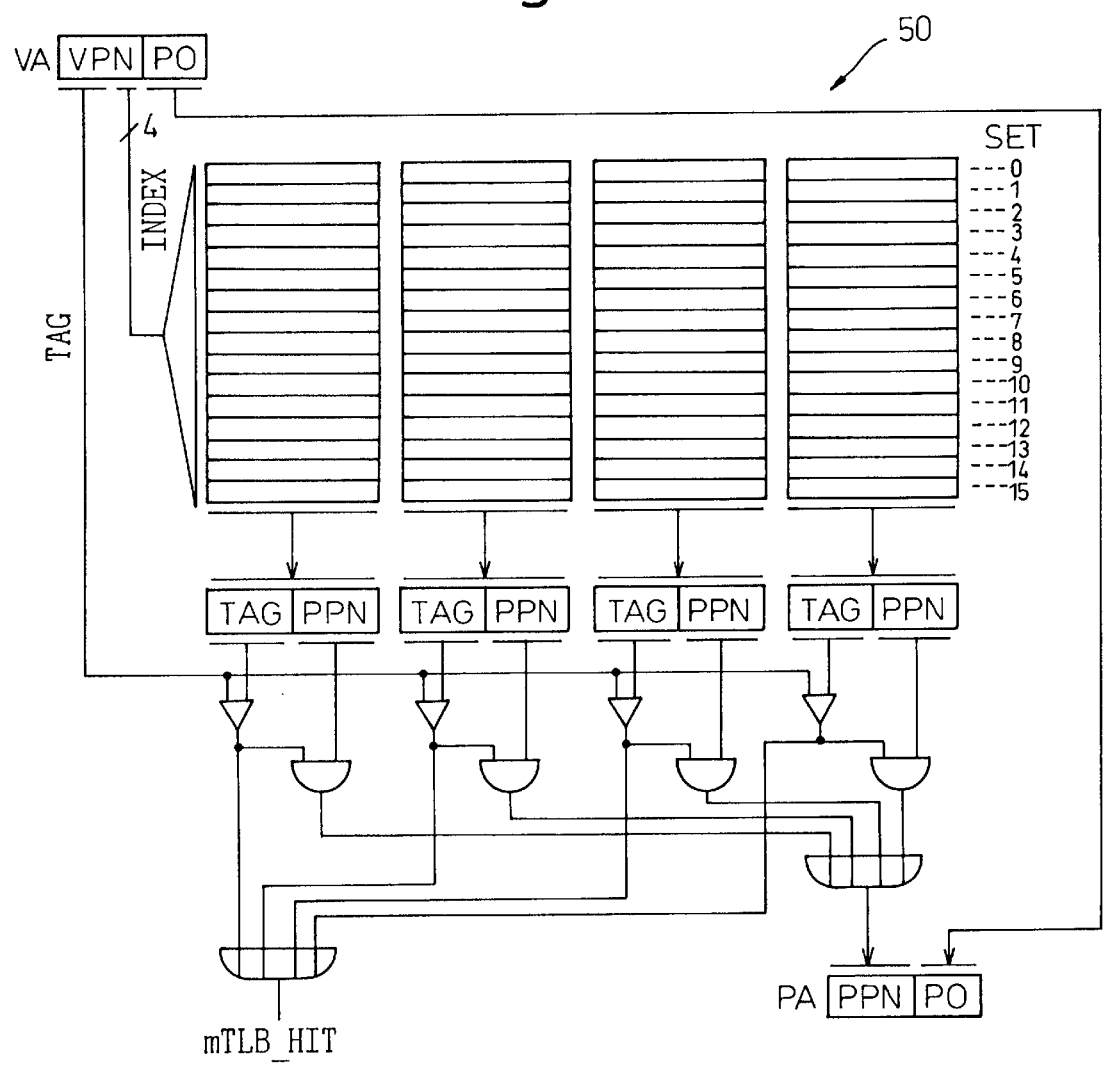
FIG. 3 is a block diagram showing the organization of a 2nd-level TLB.

FIG. 3 is a block diagram showing the organization of the mTLB 50. The mTLB 50 shown in FIG. 3 is organized, for example, as a 4-way set associative memory with 16 sets. Generally, a set associative memory has the advantages that the size is relatively small, and that the speed is relatively unaffected even if the number of entries is increased comparing with a full-associative memory, but the disadvantage is that an entry capable of storing an address translation is restricted to the entry belonging to the particular set number corresponding to its virtual page number.

In the example of FIG. 3, since the number of ways is 4, four match comparisons (associations) are performed at a time. Further, since the number of sets is 16, the low-order four bits of the virtual page number (VPN) carried in the virtual address to be translated are used as an index field to the mTLB 50 to select a set, and the remaining bits are used as a tag field. Up to four address translations can only be cached for virtual pages whose low-order four bits match.

The tag field of each entry in the mTLB 50 stores the virtual page number (VPN) excluding the low-order four bits, that is, the tag of the virtual page number, and this tag is compared with the tag of the virtual page number carried in the virtual address to be translated. In other respects, the operation is the same as that of the μTLB 30. If no matching entry is found in the mTLB 50 either, address translation is performed by referring to the address translation table 16 in the main memory 12, and the new address translation information is stored in the μTLB 30 and/or the mTLB 50.

Figure 4:
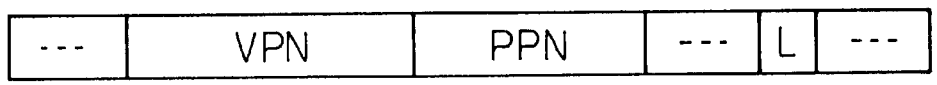
FIG. 4 is a diagram showing the data format of an entry in the upper-level TLB.

As is apparent from the above explanation, each entry in the μTLB 30 contains a virtual page number (VPN) paired with a physical page number (PPN), as shown in FIG. 4, while each entry in the mTLB 50 contains the tag of a virtual page number (VPN-TAG) paired with a physical page number (PPN).

Figure 5:
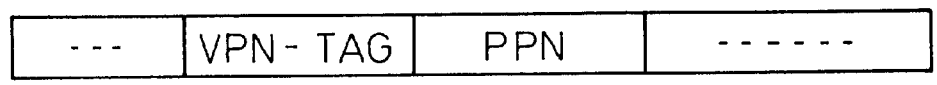
FIG. 5 is a diagram showing the data format of an entry in the lower-level TLB.

Each entry in the μTLB 30 also contains an entry lock bit (L), as shown in FIG. 4, while any entry in the mTLB 50 does not carry an entry lock bit (L), as shown in FIG. 5. That is, the entry lock function is implemented only in the μTLB 30, the higher-level TLB. The following describes entry replacement control whereby control is performed as to which entry is to be replaced to store new address translation information when the TLB is full, and entry lock control whereby particular address translation information is set so as to reside in a TLB entry.

Generally, the function of locking address translations for particular pages in the TLB is necessary to prevent the occurrence of a TLB miss during the execution of code where exception handling is not possible (for example, TLB miss handing, trap handler, etc.). To implement this, the data structure describing the page-by-page address translation in the address translation table 16 residing in the main memory 12 contains a lock bit used to specify whether or not the corresponding address translation is to be locked in the TLB, and this lock bit is managed by the OS.

However, the addresses of the pages to be locked are not always fixed and that the number of translations with identical index cannot be known. Therefore, in a set associative or direct mapped TLB in which a limitation is imposed on the entries that can store address translations, if the number of address translations that require locking becomes large, there occur limitations when mapping a program into the virtual address space. In view of this, the control logic 20 in the DAT 18 implements the entry lock function, which is performed based on the lock bit contained in the data structure of the address translation table 16, in the μTLB 30 where there are no limitations as to in which entry an address translation is to be stored.

When performing entry replacement, the control logic 20 selects the entry to be replaced in the TLB 22 based on a prescribed replacement algorithm such as LRU (Least Recently Used) in which the next entry to be replaced is the entry that was least recently used, and the control logic 20 notifies the operating system accordingly. In response, the operating system performs the entry replacement.

When an entry replacement by the operating system occurs, if the address translation table 16 in the main memory 12 shows that the address translation to be newly registered is specified to be locked, then the newly registered address translation is stored in the μTLB 30 and held locked therein. Alternatively, the newly registered address translation is stored in the mTLB 50 and, at the same time, is stored in the μTLB 30 and held locked therein.

When the entry in the mTLB 50 is selected as the entry to be replaced in accordance with the replacement algorithm, the control logic 20 reports the selection of that entry to the operating system. Then, the operating system performs the entry replacement by replacing only the entry in the mTLB 50. In this way, the locked address translation is maintained locked in the μTLB 30.

Generally, in a hierarchical TLB, control is often performed so that any entry stored in the 1st-level TLB is invariably stored in the 2nd-level TLB. This control is called inclusion. In the present invention, inclusion control is performed on all entries except the entries specified to be locked. In other words, the relationship of any entry stored in the μTLB 30 is also stored in the mTLB 50 and always holds for all entries except the entries specified to be locked.

Here, replacement of entries in the TLB 22 may be performed by hardware, not by the operating system. That is, the control logic 20 selects the entry to be replaced in the TLB 22 in accordance with the prescribed replacement algorithm, and performs the entry replacement in the TLB 22 by retrieving the address translation to be newly registered from the address translation table 16 in the main memory 12.

Then, to accomplish the entry replacement in the TLB 22, the control logic 20 refers to the address translation table 16 in the main memory 12 to see if the address translation to be newly registered is specified to be locked and, if it is specified to be locked, stores the newly registered address translation in the $\mu$TLB 30 and locks the registered address translation therein. Alternatively, the control logic 20 stores the newly registered address translation in the mTLB 50 and, at the same time, stores the registered address translation in the $\mu$TLB 30 and locks it therein.

When the entry in the mTLB 50 is selected as the entry to be replaced in accordance with the replacement algorithm, the control logic 20 replaces only the entry in the mTLB 50. In this way, the locked address translation is maintained locked in the $\mu$TLB 30.

When performing the entry replacement using the control logic 20, provision is also made not to perform the inclusion control on the entries specified to be locked, so that the relationship that any entry stored in the $\mu$TLB 30 is also stored in the mTLB 50 always holds for all entries except the entries specified to be locked.

Figure 6:
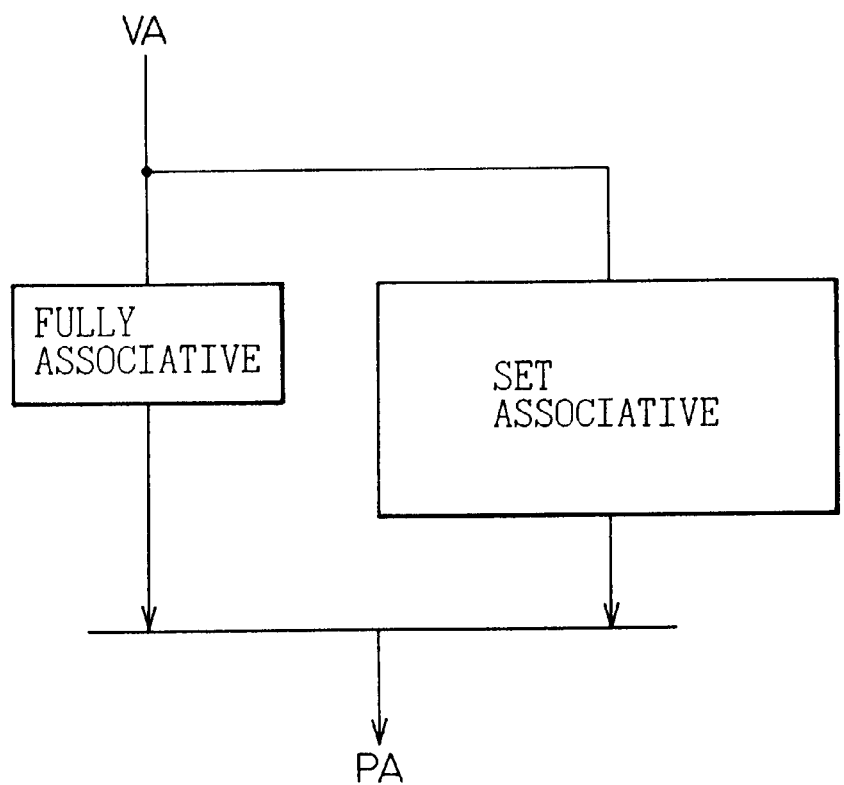
FIG. 6 a diagram showing a TLB having a parallel structure according to the prior art.

FIG. 6 is a diagram showing a TLB having a parallel structure according to the prior art. In such a parallel structure, the speed decreases because reference is made simultaneously to a full associative memory and a set associative memory; by contrast, in the present invention, since only the higher level buffer is first referred to, the speed does not decrease. Furthermore, in the parallel structure, there is a need to switch between the output of the full associative memory and the output of the set associative memory, and this switching leads to overhead; in the present invention, however, such switching does not occur. Moreover, in the prior art system, if multiple memory accesses are to be translated simultaneously, the number of ports on both associative memories must be increased, and the overall size increases, but in the present invention, the overall size does not increase since the number of ports on only the $\mu$TLB needs to be increased.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A microprocessor for performing dynamic address translation from a virtual address to a physical address on a page-by-page basis, said microprocessor comprising:
    (a) an address translation buffer having an entry lock function and including:
        (1) a lower-level buffer organized as a lower-level hierarchy of said address translation buffer and having no entry lock function, and
        (2) a higher-level buffer organized as a higher-level hierarchy of said address translation buffer and having said entry lock function, said higher-level buffer having higher associativity than the associativity of said lower-level buffer; and
    (b) control logic for controlling operation of said address translation buffer.

2. A microprocessor as claimed in claim 1, wherein said lower-level buffer is larger in capacity than said higher-level buffer.

3. A microprocessor as claimed in claim 1, wherein address translation for each page is stored in an address translation table residing in a main memory managed by an operating system, and wherein said address translation table has a data structure that contains a specifier indicating whether or not a corresponding address translation is to be locked in said address translation buffer, and said control logic locks an entry in said higher-level buffer in accordance with said lock specifier contained in said data structure of said address translation table.

4. A microprocessor as claimed in claim 3, wherein said control logic selects an entry to be replaced in said address translation buffer in accordance with a prescribed replacement algorithm and notifies said operating system, and said operating system performs the replacement of said entry in said address translation buffer.

5. A microprocessor as claimed in claim 4, wherein when an entry replacement by said operating system occurs, if said address translation table in said main memory shows that the address translation to be newly registered is specified to be locked, then the newly registered address translation is stored in said higher-level buffer and held locked therein.

6. A microprocessor as claimed in claim 4, wherein when an entry replacement by said operating system occurs, if said address translation table in said main memory shows that the address translation to be newly registered is specified to be locked, then the newly registered address translation is stored in said lower-level buffer and, at the same time, is stored in said higher-level buffer and held locked therein.

7. A microprocessor as claimed in claim 4, wherein when said control logic has selected in accordance with said replacement algorithm an entry in said lower-level buffer as the entry to be replaced, said control logic reports the selection of said entry in said lower-level buffer to said operating system, and said operating system accomplishes the replacement by only replacing said entry in said lower-level buffer, thereby maintaining intact the address translation locked in said higher-level buffer.

8. A microprocessor as claimed in claim 7, wherein for entries other than the entry specified to be locked, a relationship always holds such that any entry stored in said higher-level buffer is also stored in said lower-level buffer.

9. A microprocessor as claimed in claim 3, wherein said control logic selects an entry to be replaced in said address translation buffer in accordance with a prescribed replacement algorithm, retrieves the address translation to be newly registered from said address translation table residing in said main memory, and performs the replacement of said entry in said address translation buffer.

10. A microprocessor as claimed in claim 9, wherein when performing the replacement of said entry in said address translation buffer, said control logic refers to said address translation table in said main memory to see whether or not the address translation to be newly registered is specified to be locked and, if it is so specified, stores the newly registered address translation in said higher-level buffer and locks said registered address translation therein.

11. A microprocessor as claimed in claim 9, wherein when performing the replacement of said entry in said address translation buffer, said control logic refers to said address translation table in said main memory to see whether or not the address translation to be newly registered is specified to be locked and, if it is so specified, stores the newly registered address translation in said higher-level buffer and locks said registered address translation therein, while also storing said registered address translation in said newly lower-level buffer.

12. A microprocessor as claimed in claim 9, wherein when said control logic has selected in accordance with said replacement algorithm an entry in said lower-level buffer as the entry to be replaced, said control logic only replaces said entry in said lower-level buffer, thereby maintaining intact the address translation locked in said higher-level buffer.

13. A microprocessor as claimed in claim 12, wherein for entries other than the entry specified to be locked, a relationship always holds such that any entry stored in said higher-level buffer is also stored in said lower-level buffer.

14. A method for implementing dynamic address translation from a virtual address to a physical address in a microprocessor, comprising the steps of:
preparing an address translation buffer consisting of a lower-level buffer having no entry lock function and a higher-level buffer having an entry lock function and having higher associativity than the associativity of said lower-level buffer;
preparing in a main memory an address translation table for storing address translation for each page, said address translation table having a data structure containing a specifier to indicate whether or not a corresponding address translation is to be locked in said address translation buffer; and
locking an entry in said higher-level buffer in accordance with said lock specifier contained in said data structure of said address translation table.

15. A method as claimed in claim 14, further comprising the step of selecting an entry to be replaced in said address translation buffer in accordance with a prescribed replacement algorithm, and performing the replacement of said entry in said address translation buffer.

16. A method as claimed in claim 15, further comprising the step of performing the entry replacement by storing newly registered address translation in said higher-level buffer and locking said registered address translation therein if said address translation table in said main memory shows that the address translation to be newly registered is specified to be locked.

17. A method as claimed in claim 15, further comprising the step of performing the entry replacement by storing newly registered address translation in said higher-level buffer and locking said registered address translation therein, while also storing said registered address translation in said lower-level buffer, if said address translation table in said main memory shows that the address translation to be newly registered is specified to be locked.

18. A computer incorporating a microprocessor equipped with an address translation mechanism for performing dynamic address translation from a virtual address to a physical address on a page-by-page basis, said address translation mechanism comprising:
(a) an address translation buffer having an entry lock function and including:
(1) a lower-level buffer organized as a lower-level hierarchy of said address translation buffer and having no entry lock function, and
(2) a higher-level buffer organized as a higher-level hierarchy of said address translation buffer and having said entry lock function, said higher-level buffer having higher associativity than the associativity of said lower-level buffer; and
(b) control logic for controlling operation of said address translation buffer.

19. A computer as claimed in claim 18, wherein address translation for each page is stored in an address translation table residing in a main memory managed by an operating system, and wherein said address translation table has a data structure that contains a specifier indicating whether or not a corresponding address translation is to be locked in said address translation buffer, and said control logic locks an entry in said higher-level buffer in accordance with said lock specifier contained in said data structure of said address translation table.

20. A computer as claimed in claim 19, wherein said control logic selects an entry to be replaced in said address translation buffer in accordance with a prescribed replacement algorithm and notifies said operating system, and said operating system performs the replacement of said entry in said address translation buffer.

21. A computer as claimed in claim 20, wherein when an entry replacement by said operating system occurs, if said address translation table in said main memory shows that the address translation to be newly registered is specified to be locked, then the newly registered address translation is stored in said lower-level buffer and, at the same time, is stored in said higher-level buffer and held locked therein.

22. A microprocessor as claimed in claim 1, wherein said lower-level buffer is set associative memory and said higher-level buffer is full associative memory.

23. A microprocessor as claimed in claim 22, wherein said lower-level buffer comprises a 4-way set associative memory and said higher-level buffer comprises a 64-way full associative memory.

24. A microprocessor as claimed in claim 22, wherein said lower-level buffer is larger in capacity than said higher-level buffer.

25. The method of claim 14, wherein said lower-level buffer is larger in capacity than said higher-level buffer.

26. The method of claim 25, wherein said lower-level buffer is set associative memory and said higher-level buffer is full associative memory.

27. The method of claim 14, further comprising: translating a virtual address into a physical address using the address translation buffer.

28. The computer of claim 18, wherein said lower-level buffer is larger in capacity than said higher-level buffer.

29. The computer of claim 27, wherein said lower-level buffer is set associative memory and said higher-level buffer is full associative memory.

30. The computer of claim 18, wherein said lower-level buffer is set associative memory and said higher-level buffer is full associative memory.

31. The computer of claim 18, wherein said lower-level buffer comprises a 4-way set associative memory and said higher-level buffer comprises a 64-way full associative memory.

* * * * *